(No Model.)

J. STARK.
ANTI-FRICTION BEARING FOR DRAW-IN SPINDLES.

No. 422,259. Patented Feb. 25, 1890.

Witnesses.
Selma R. Schelin.
Geo. W. White

Inventor.
John Stark.
by N. Van Andrén
his atty.

UNITED STATES PATENT OFFICE.

JOHN STARK, OF WALTHAM, MASSACHUSETTS.

ANTI-FRICTION BEARING FOR DRAW-IN SPINDLES.

SPECIFICATION forming part of Letters Patent No. 422,259, dated February 25, 1890.

Application filed December 22, 1888. Serial No. 294,389. (No model.)

*To all whom it may concern:*

Be it known that I, JOHN STARK, a citizen of the United States, and a resident of Waltham, in the county of Middlesex and State of Massachusetts, have invented new and useful Improvements in Anti-Friction Bearings for Drawing-in Spindles, of which the following, taken in connection with the accompanying drawings, is a specification.

Figure 1:
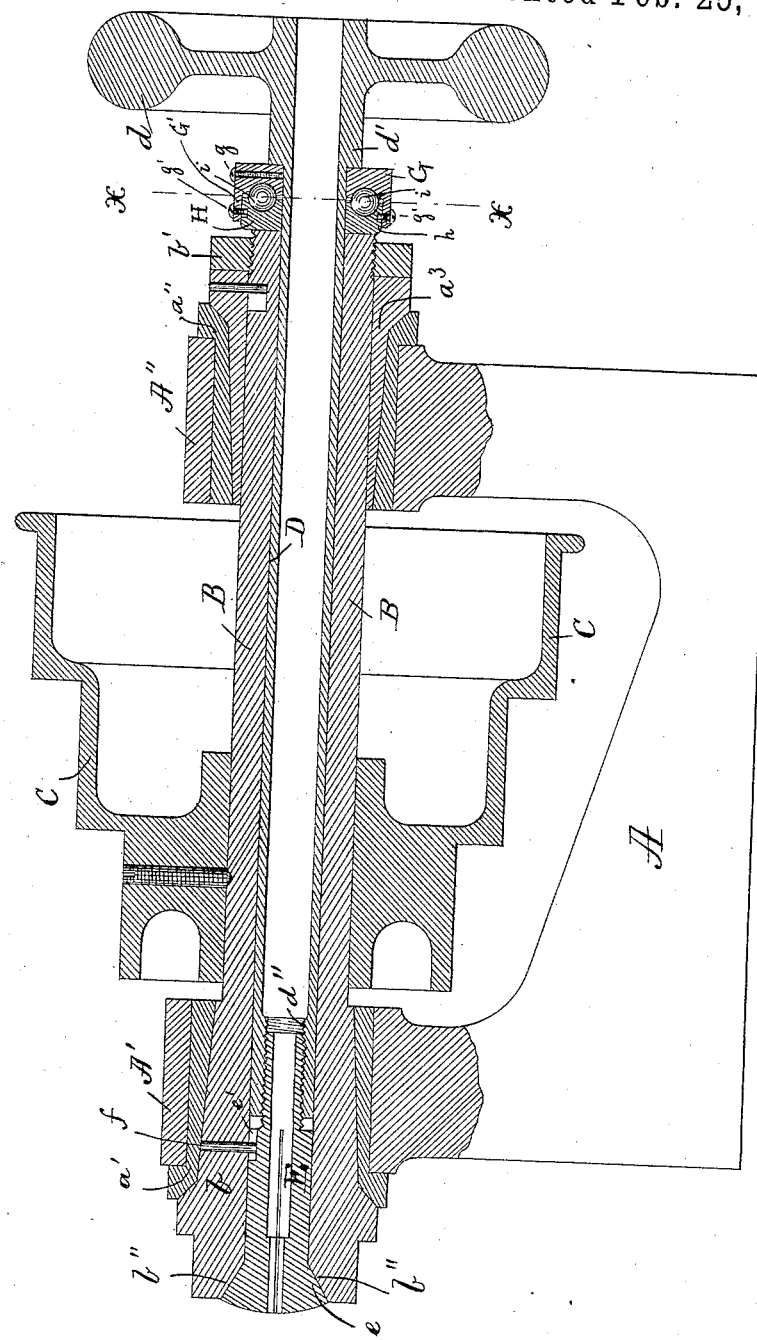
Figure 2:
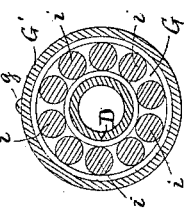

In the drawings, Figure 1 represents a central longitudinal section of a lathe-head stock having its drawing-in spindle provided with my invention, and Fig. 2 represents a cross-section on the line X X shown in Fig. 1.

Similar letters refer to similar parts wherever they occur on the different parts of the drawings.

In head-stocks for lathes, where a drawing-in spindle is used for the purpose of closing the chuck so as to hold the article that is to be turned, it generally requires a great deal of power to turn the hand-wheel on the drawing-in spindle during the closing movement of the chuck, owing to the great frictional resistance between the hub of the hand-wheel on the drawing-in spindle.

The object of my invention is to provide novel means for avoiding excessive frictional resistance between the inner end of the handle-wheel hub and the rear end of the chuck-spindle when the chuck is compressed, whereby a boy or girl can readily manipulate the hand-wheel for closing and opening the chuck, and thus avoid the necessity and expense of employing a man for this purpose.

A represents the head-stock of a lathe, and A' A" represent, respectively, the front and rear bearings thereon as usual.

$a'$ and $a''$ are the usual tapering steel bearing-sleeves in the said respective bearings A' and A", as shown in Fig. 1.

B is the tubular chuck-spindle, as usual, having the tapering enlarged forward end $b$ journaled in the front bearing-sleeve $a'$, as shown in Fig, 1.

$a^3$ is the usual tapering metal sleeve at the rear end of the chuck-spindle B, and $a''$ is the correspondingly-shaped sleeve-bearing in which the sleeve $a^3$ is journaled, as usual.

$b'$ is a nut screwed on the rear end of the chuck-spindle B in the usual manner.

C is the cone-pulley, as usual secured in a suitable manner to the chuck-spindle B between its bearings, as shown in Fig. 1.

D is the tubular drawing-in spindle, as usual journaled within the tubular chuck-spindle B, said drawing-in spindle having in its rear end the hand-wheel $d$, of which $d'$ is the hub. The forward end of said drawing-in spindle is provided with an internal screw-thread $d''$, adapted to receive the screw-threaded rear end of the slitted expansive chuck E, as usual, said chuck having a conical or tapering outer end $e$ adapted to fit in a correspondingly-shaped conical or tapering recess $b''$ in the forward end of the chuck-spindle B, as is common in devices of this kind.

$f$ is the usual stop-pin driven through a perforation in the tapering portion $b$ of the chuck-spindle, its inner end being made to project into a longitudinal groove $e'$ on the chuck E, as usual, so as to prevent said chuck from turning around its axis when the hand-wheel $d$ is turned around for the purpose of clamping the work within the chuck or liberating it therefrom, as the case may be. Usually the inner end of the hub of the hand-wheel $d$ on the drawing-in spindle bears against the rear end of the chuck-spindle B, and to overcome the frictional resistance between such parts when the drawing-in spindle is turned to close the chuck a great and unnecessary expenditure of power is required, and to avoid this, so as to reduce the friction between the ends of the hand-wheel hub $d'$ and the chuck-spindle B, I arrange between said parts an anti-friction ball-bearing, preferably composed of an internally-grooved cap G, into which is fitted loosely a similarly-grooved block or disk H, both of which parts surround the drawing-in spindle D, as shown in the drawings, the cap G being preferably secured to the drawing-in spindle D by means of a set-screw $g$ or equivalent or well-known device.

$i$ $i$ are the anti-friction steel balls loosely arranged within the grooved cap and disk, as shown.

The disk H is loosely journaled on the drawing-in spindle D, and to prevent its getting detached from the cap G, I make on its outer periphery a groove $h$, into which project the inner ends of the small screws $g'$ $g'$, that are screwed through the annular flanged part G' of the cap G, as shown in Fig. 1. It will thus be seen that when the hand-wheel $d$ is turned for the purpose of closing the chuck the longitudinal pressure of the hand-wheel hub against the end of the chuck-spindle will be transferred to the anti-frictional device arranged between said parts, by which arrangement the said hand-wheel may be turned with ease for the purpose set forth.

What I wish to secure by Letters Patent, and claim, is—

1. The combination, with the head-stock, the chuck, the tubular chuck-spindle, and the drawing-in spindle journaled within the chuck-spindle and provided with a hand-wheel, of an anti-friction bearing mounted on the drawing-in spindle and interposed between the rear end of the tubular chuck-spindle and the inner end of the hub of the hand-wheel on the drawing-in spindle for transferring the direct pressure of the hand-wheel hub from the chuck-spindle to such anti-friction bearing, substantially as and for the purpose described.

2. The combination, with the tubular chuck-spindle and the drawing-in spindle located in the former and having a hand-wheel, of an anti-friction bearing interposed between the rear end of the chuck-spindle and the hand-wheel hub, and composed of a cap G, rigidly fastened by a screw $g$ to the drawing-in spindle and revolving therewith, a disk H, loosely mounted on the drawing-in spindle and loosely connected with the said cap, and balls between the disk and cap, substantially as shown and described.

In testimony whereof I have signed my name to this specification, in the presence of two subscribing witnesses, on this 17th day of December, A. D. 1888.

JOHN STARK.

Witnesses:
 DANIEL W. WILLIAMS,
 GEO. A. FLAGG.